United States Patent
Koike et al.

(10) Patent No.: US 10,049,049 B2
(45) Date of Patent: Aug. 14, 2018

(54) METHOD AND SYSTEM FOR CACHING DATA MANAGED BY PLURAL INFORMATION PROCESSING APPARATUSES

(71) Applicant: FUJITSU LIMITED, Kawasaki-shi, Kanagawa (JP)

(72) Inventors: Yasuo Koike, Numadu (JP); Kazuhisa Fujita, Shizuoka (JP); Toshiyuki Maeda, Suntou (JP); Tadahiro Miyaji, Nagoya (JP); Tomonori Furuta, Nagoya (JP); Fumiaki Itou, Kasugai (JP)

(73) Assignee: FUJITSU LIMITED, Kawasaki (JP)

( * ) Notice: Subject to any disclaimer, the term of this patent is extended or adjusted under 35 U.S.C. 154(b) by 262 days.

(21) Appl. No.: 14/860,169

(22) Filed: Sep. 21, 2015

(65) Prior Publication Data
US 2016/0011980 A1    Jan. 14, 2016

Related U.S. Application Data

(63) Continuation of application No. PCT/JP2013/058930, filed on Mar. 27, 2013.

(51) Int. Cl.
    *G06F 12/00* (2006.01)
    *G06F 12/0871* (2016.01)
    (Continued)

(52) U.S. Cl.
    CPC ...... *G06F 12/0871* (2013.01); *G06F 12/0875* (2013.01); *G06F 17/30132* (2013.01);
    (Continued)

(58) Field of Classification Search
    CPC ............ G06F 12/0871; G06F 12/0875; G06F 17/30132; G06F 17/30194; G06F 2212/314; G06F 2212/452; G06F 2212/6042
    (Continued)

(56) References Cited

U.S. PATENT DOCUMENTS

| 5,511,177 A | 4/1996 | Kagimasa et al. |
| 5,548,724 A | 8/1996 | Akizawa et al. |

(Continued)

FOREIGN PATENT DOCUMENTS

| JP | 06-332625 A | 12/1994 |
| JP | 06-332782 A | 12/1994 |

(Continued)

OTHER PUBLICATIONS

English translation of the International Search Report dated May 21, 2013 in PCT/JP2013/058930 filed Mar. 27, 2013.

(Continued)

*Primary Examiner* — Mardochee Chery
(74) *Attorney, Agent, or Firm* — Oblon, McClelland, Maier & Neustadt, L.L.P.

(57) ABSTRACT

A disclosed information processing method is executed in a distributed processing system that processes data by plural information processing apparatuses. And the information processing method includes: obtaining, by a first information processing apparatus of the plural information processing apparatuses and from a second information processing apparatus that manages relations among data, identification information of first data that has a predetermined relation with second data and identification information of an information processing apparatus that manages the first data, upon detecting access to the second data managed by the first information processing apparatus; reading out, by the (Continued)

first information processing apparatus, the first data, upon determining that the information processing apparatus that manages the first data corresponds to the first information processing apparatus; and loading, by the first information processing apparatus, the first data into a cache.

11 Claims, 20 Drawing Sheets

(51) Int. Cl.
    *G06F 12/0875* (2016.01)
    *G06F 17/30* (2006.01)
(52) U.S. Cl.
    CPC .. *G06F 17/30194* (2013.01); *G06F 2212/314* (2013.01); *G06F 2212/452* (2013.01); *G06F 2212/6042* (2013.01)
(58) Field of Classification Search
    USPC .......................................................... 711/126
    See application file for complete search history.

(56) References Cited

U.S. PATENT DOCUMENTS

| | | | |
|---|---|---|---|
| 5,559,984 | A | 9/1996 | Nakano et al. |
| 7,416,124 | B2* | 8/2008 | Yoshida ............... G06Q 10/087 235/382 |
| 7,630,960 | B2* | 12/2009 | Koike ............... G06F 17/30029 |
| 2005/0223174 | A1 | 10/2005 | Mogi et al. |
| 2006/0218350 | A1 | 9/2006 | Mogi et al. |
| 2007/0030964 | A1* | 2/2007 | Soda ..................... H04L 9/0891 380/44 |
| 2007/0245088 | A1 | 10/2007 | Mogi et al. |
| 2012/0102392 | A1* | 4/2012 | Reesman .......... G06F 17/30905 715/243 |
| 2013/0198230 | A1 | 8/2013 | Ochi et al. |
| 2013/0218928 | A1* | 8/2013 | Kawamata ........ G06F 17/30958 707/798 |

FOREIGN PATENT DOCUMENTS

| | | |
|---|---|---|
| JP | 07-093205 A | 4/1995 |
| JP | 11-024981 A | 1/1999 |
| JP | 2004-118482 A | 4/2004 |
| JP | 2005-285058 A | 10/2005 |
| JP | 2008-146380 A | 6/2008 |
| JP | 2010-092222 A | 4/2010 |
| JP | 2011-197977 A | 10/2011 |
| JP | 2013-156765 A | 8/2013 |

OTHER PUBLICATIONS

Written Opinion dated May 21, 2013 in PCT/JP2013/058930 filed Mar. 27, 2013, with partial English translation.
Jeffrey Dean, et al., "MapReduce: Simplified Data Processing on Large Clusters", Symposium on Operating System Design and Implementation 2004, Dec. 2004, 14 Pages, with English Abstract obtained from Google http://research.google.com/archive/mapreduce.html.
Office Action dated Aug. 23, 2016 in Japanese Patent Application No. 2015-507761 (with Partial English language translation).

* cited by examiner

| FILE | RELATED FILE |
|---|---|
| A-1 | A-2,A-3,B-1 |
| A-2 | A-1,A-3,B-2 |
| A-3 | A-1,A-2,B-3 |
| ⋮ | ⋮ |

| FILE | RELATED FILE |
|---|---|
| A | B(a TIMES),C(b TIMES) |
| B | A(c TIMES) |
| C | D(d TIMES) |
| ⋮ | ⋮ |

| TIME | FILE | USER |
|---|---|---|
| 12:00.000 | A | USER 1 |
| 12:10.000 | B | USER 1 |
| 12:12.000 | A | USER 1 |
| 12:13.000 | C | USER 2 |
| 14:30.000 | D | USER 1 |
| ⋮ | ⋮ | ⋮ |
| 14:30.000 | Z | USER 3 |

| FILE | RELATED FILE |
|---|---|
| A | B(a TIMES),C(b TIMES) |
| B | A(c TIMES) |
| C | D(d TIMES) |
| ⋮ | ⋮ |

METHOD AND SYSTEM FOR CACHING DATA MANAGED BY PLURAL INFORMATION PROCESSING APPARATUSES

CROSS-REFERENCE TO RELATED APPLICATIONS

This application is a continuing application, filed under 35 U.S.C. section 111(a), of International Application PCT/JP2013/058930, filed on Mar. 27, 2013, the entire contents of which are incorporated herein by reference.

FIELD

This invention relates to a technique for distributed processing.

BACKGROUND

In recent years, there has been a need for a technique to process large amounts of data (hereafter, referred to as "big data") that occur in a website, sensor, mobile terminal and the like in a short period of time.

A distributed processing framework called Hadoop is known a technique for processing big data. In Hadoop, one file is divided into plural files based on a distributed processing method called MapReduce, and the files are processed in parallel at plural nodes. A feature of Hadoop is that processing performance increases as the number of nodes increases. Therefore, by using Hadoop, a large-scale system in which several petabytes or more of data are processed at several tens to several thousands of nodes can be achieved comparatively easily.

Hadoop employs a distributed file system called HDFS (Hadoop Distributed File System) in order to effectively perform distributed processing. HDFS divides a file into specific sizes, distributes and stores the divided files among plural servers, creates copies of the divided files, and saves the copied files on different servers from the servers where the copy-source files are saved. In distributed processing, because either the copy-source files or the copied files are processed, by the HDFS allocating the processing among servers in which there is space for work processes, the server resources (CPU (Central Processing Unit) resources and the like) can be used effectively.

However, in a distributed file system such as HDFS, the status of the OS (Operating System) cache is not taken into consideration when dividing the processing. Therefore, because a distributed processing system allocates processing among different servers without taking that into consideration even when there is data in the cache of a server, disk I/O (Input/Output) occurs. Disk I/O is processing that takes time; for example, approximately half of the time required for processing several gigabytes of data is taken up by disk seek time.

The processing of big data by a distributed file system will be explained using FIG. 1. File A is stored in a disk of server 1, file B is stored in a disk of server 2, a copy of the file B and file C are stored in a disk of server 3. Moreover, the file B is loaded into a cache of the server 3. An application program that is arranged on one of the servers of the distributed processing system performs processing in the order of the file A, the file B and the file C. After performing processing of the file A on the server 1, the application program processes the file B on the server 2 or the server 3. By performing processing of the file B on the server 3, disk I/O does not occur because it is possible to use the cache. However, the server 2 may sometimes be selected, because whether to select the server 2 or the server 3 is determined according to a situation of available processes on the server 2 or the server 3. In that case, the time until processing of the file is finished may be greatly delayed because disk I/O occurs.

Therefore, from the aspect of completing the processing of a file in a short amount of time, it is favorable to improve a cache hit rate in the distributed processing system.

A technique such as the following is known for distributed processing and cache management. More specifically, a MapReduce processing system divides data to be processed into plural groups based on frequency of updating data, and calculates group update frequency based on the frequency of updating data included in a group. Then, the MapReduce processing system generates partial results of MapReduce processing stages of a group for which the group update frequency is equal to or less than a threshold value, and caches the generated partial results. As a result, the cache is effectively used in the MapReduce processing.

Moreover, as for using the cache effectively, there is also a technique such as the following. More specifically, the data of all or part of the areas of a file are multiplexed when opening the file, and together with distributing the multiplexed data among plural drives, the multiplexed data of the file is deleted when the file is closed.

Moreover, there is also a technique for preventing a decrease in throughput due to a concentration of access requests for a certain file server from plural clients. More specifically, a master file server selects a file server having a light load, and allocates file access requests that were transmitted from client to the selected file server.

Moreover, there is a technique for providing high-speed file access regardless of the state of the wide-area network. More specifically, a cache server has an access log database that records file access, and determines files to be read in advance by analyzing intervals between updates of files having a high access frequency by using the access log database. Then, the cache server reads files having a high access frequency in advance during a time period in which the wide area network is available, and provides the files read in advance in response to a request from a client.

Moreover, there is also a technique that improves a cache hit rate and increases the speed of file access by preferentially caching files having a high frequency of use for each user that logs onto a client.

However, even when these techniques are used, it may not always be possible to sufficiently improve the cache hit rate of a distributed processing system. Moreover, the conventional techniques are also insufficient from the aspect of effectively using the cache of a server.

Non-Patent Document 1: DEAN Jeffrey et al., "MapReduce: Simplified Data Processing on Large Clusters", [online], December 2004, Symposium on Operating System Design and Implementation 2004, [retrieved on Jan. 10, 2013], Retrieved from the Internet: <URL: http://research.google.com/archive/mapreduce.html>

Patent Document 1: Japanese Laid-open Patent Publication No. 2010-92222

Patent Document 2: Japanese Laid-open Patent Publication No. 6-332625

Patent Document 3: Japanese Laid-open Patent Publication No. 6-332782

Patent Document 4: Japanese Laid-open Patent Publication No. 11-24981

Patent Document 5: Japanese Laid-open Patent Publication No. 7-93205

SUMMARY

An information processing method relating to a first aspect of this invention is executed in a distributed processing system that processes data by plural information processing apparatuses. And the information processing method includes: obtaining, by a first information processing apparatus of the plural information processing apparatuses and from a second information processing apparatus that manages relations among data, identification information of first data that has a predetermined relation with second data and identification information of an information processing apparatus that manages the first data, upon detecting access to the second data managed by the first information processing apparatus; reading out, by the first information processing apparatus, the first data, upon determining that the information processing apparatus that manages the first data corresponds to the first information processing apparatus; and loading, by the first information processing apparatus, the first data into a cache.

An information processing method relating to a second aspect of this invention is executed in a distributed processing system that processes data by plural information processing apparatuses. And the information processing method includes: extracting, by a first information processing apparatus of the plural information processing apparatuses, identification information of first data that has a predetermined relation with second data from a related data storage unit that stores data in association with identification information of the data and identification information of data that has the predetermined relation with the data, upon receiving a first request to request information for the first data that has the predetermined relation with the second data from a second information processing apparatus that manages the second data; and transmitting, by the first information processing apparatus, the extracted identification information of the first data and identification information of an information processing apparatus that manages the first data to a transmission source of the first request.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 2:
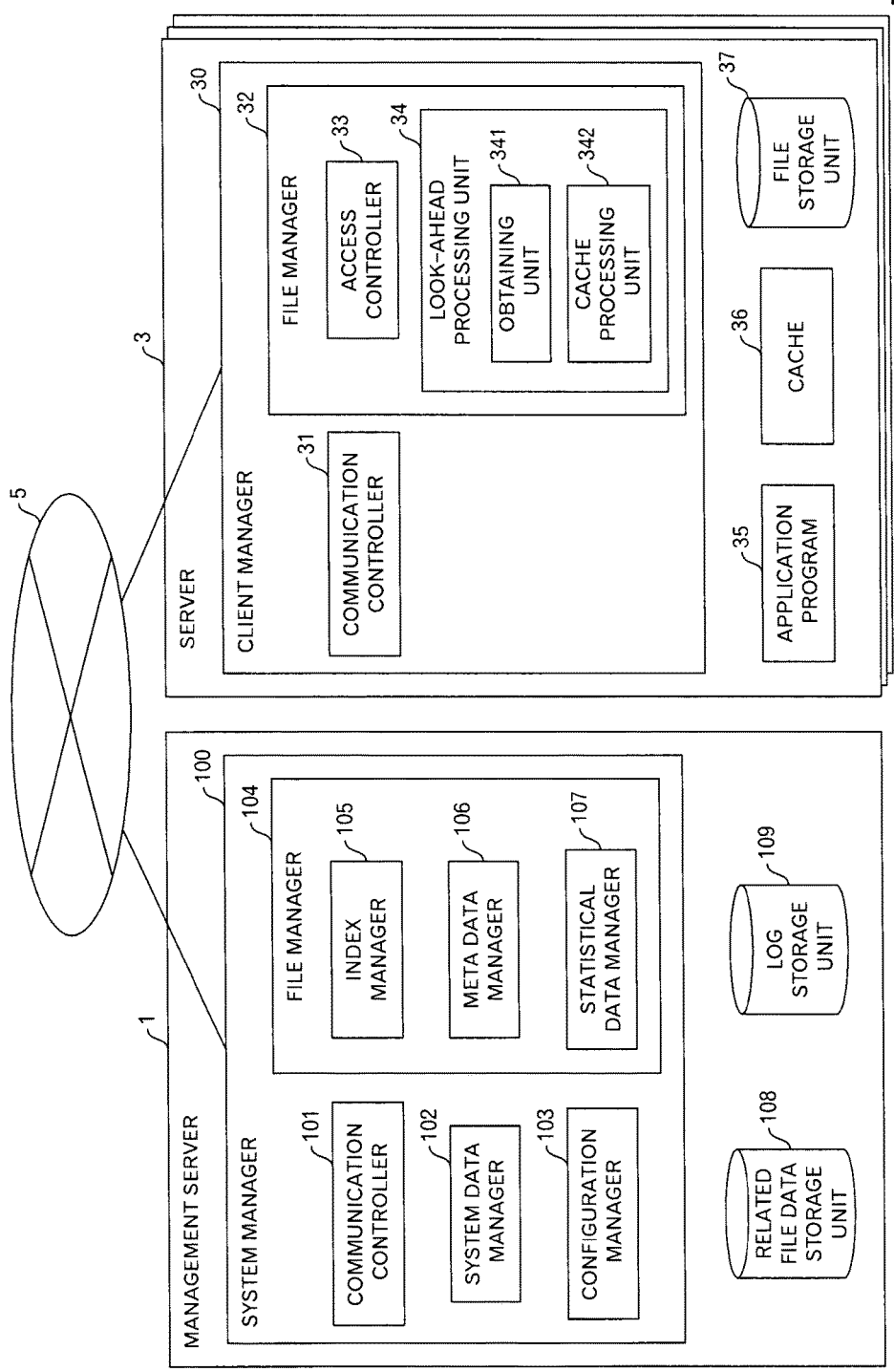
FIG. 2 is a diagram depicting an overview of a system of this embodiment.

FIG. 2 illustrates an overview of a distributed processing system of an embodiment. For example, a management server 1 and plural servers 3 are connected to a network 5, for example the Internet. In the distributed processing system illustrated in FIG. 2, an application program 35 of the plural servers 3 performs processing for a file managed by one of the plural servers 3.

The management server 1 has a system manager 100, a related file data storage unit 108, and a log storage unit 109. The system manager 100 has a communication controller 101, a system data manager 102, a configuration manager 103, and a file manger 104 that includes an index manager 105, a meta data manager 106 and a statistical data manager 107.

The communication controller 101 performs processing for communication. The system data manager 102 manages data that is shared in the distributed processing system (for example, block sizes of files or the number of copied files, and the like). The configuration manager 103 manages configuration of clusters in the distributed processing system and performs alive monitoring for the clusters. The file manager 104 performs processing to manage data that is stored in the related file data storage unit 108 and data that is stored in the log storage unit 109. The index manager 105 manages files managed by each server 3 by a file index having binary tree structure. The meta data manager 106 manages meta data of files (for example, sizes of files, owners of files, and the like). The statistical data manager 107 updates data stored in the related file data storage unit 108 by identifying a statistical relation among files by using data stored in the log storage unit 109.

Figures 3, 4, 5:
FIG. 3 is a diagram depicting an example of related file data generated based on a configurational relation.
FIG. 4 is a diagram depicting an example of related file data generated based on a statistical relation.
FIG. 5 is a diagram for explaining generation of related file data based on a statistical relation.

FIG. 3 illustrates an example of related file data that is stored in the related file data storage unit 108. In the example in FIG. 3, the related file data includes identifiers of files and identifiers of files related to those files (hereafter, called "related files"). Related files are files for which there is a high possibility of being accessed at timing near the timing when a specific file was accessed.

As the relation, there are a configurational relation, a statistical relation, and a relation according to a user designation. The related file data illustrated in FIG. 3 is related file data that is generated based on the configurational relation. Files that have configurational relation are plural files that are obtained by dividing a file that was originally one file, files that are stored in the same or nearby directories, or files having the same timestamp. Files that have the configurational relation have a high possibility of being accessed at one time in lumped processing such as batch processing. In FIG. 3, file A-1, file A-2 and file A-3 are files obtained by dividing file A, so the related file data illustrated in FIG. 3 is data that represents that these files have the configurational relation. Moreover, file B-1 is stored in the same or nearby directory, or has the same timestamp as the file A-1.

FIG. 4 illustrates an example of related file data that is generated based on a statistical relation. In the example in FIG. 4, the related file data includes file identifiers, related file identifiers, and numerical values representing the number of times that the related files have been accessed. The number of times that the related files have been accessed represents the number of times of access to the related files in a predetermined period after access to a target file.

As illustrated in FIG. 5, the related file data that is generated based on the statistical relation is generated by the statistical data manager 107 based on access log that is stored in the log storage unit 109. The access log is illustrated on the left side of FIG. 5, and related file data that is generated based on the statistical relation is illustrated on the right side of FIG. 5. For example, in batch processing and similar, files may be accessed at a predetermined time, and files may be accessed in a predetermined order. Therefore, when it is determined using the access log that a predetermined condition (for example, a condition that the access is within a predetermined time period, a condition that the access is in a predetermined access order, or a condition that the access is by a predetermined user) is satisfied, a file is regarded as being a related file.

The related file data based on the statistical relation is generated so as to be closer to the start of the chain structure the closer the relation (for example, the larger the number of access) of the related file is.

Defining the relation by a designation from the user is especially effective when the access pattern is fixed.

Figure 6:
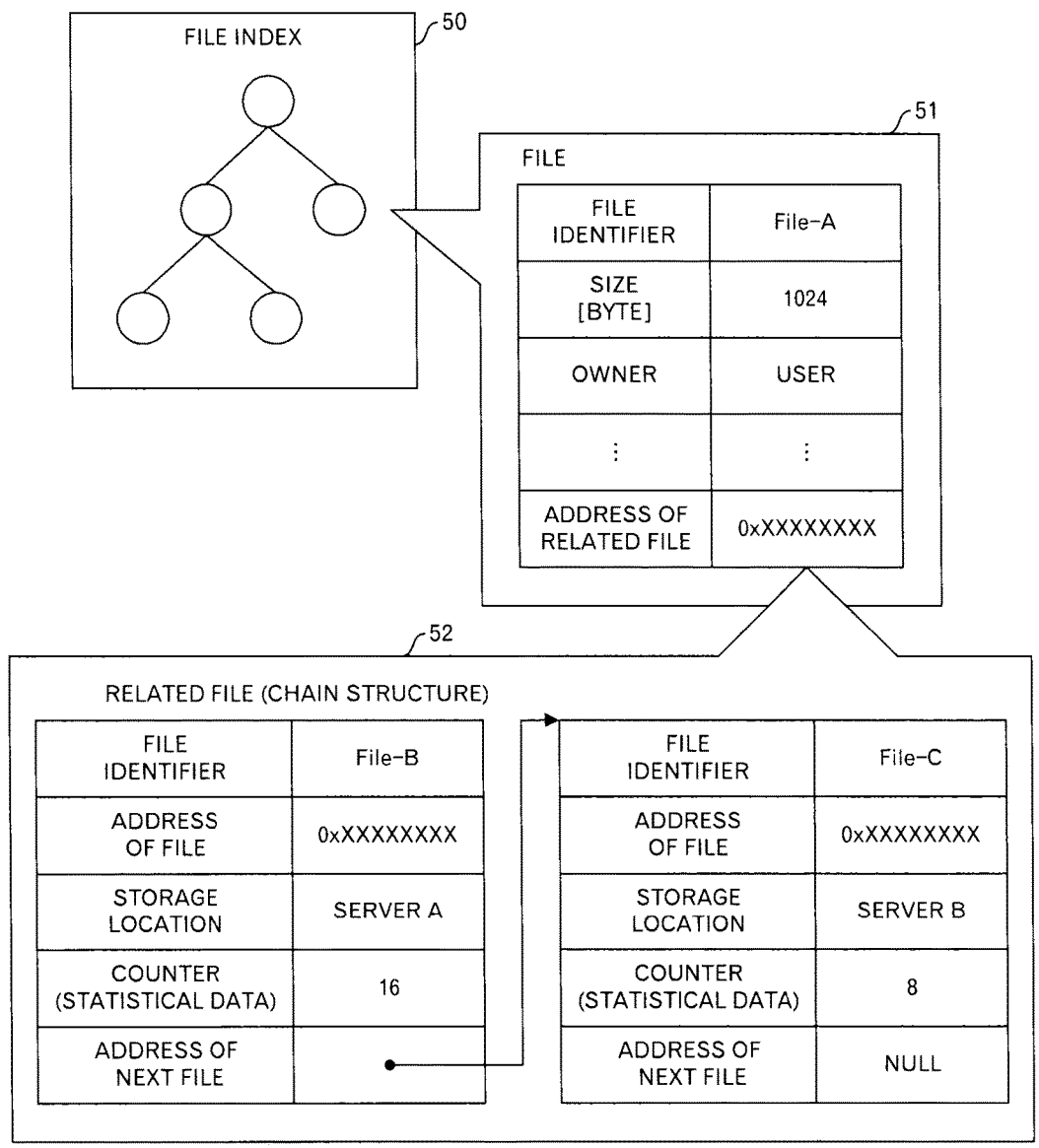
FIG. 6 is a diagram depicting a detailed example of the data structure of the related file data storage unit.

FIG. 6 illustrates a detailed example of data structure of the related file data storage unit 108. Information of related files is one of attributes of information on a file managed by the distributed file system. In the example in FIG. 6, a link to the file information 51 is attached to the file index 50 that the index manager 105 manages. A pointer member that points to the information of related files of that file is included in a structure of the file information 51.

The related file data 52 has chain structure, and links to information of related files are connected. A file identifier, an address of related file information, information representing a storage location of the related file, a counter representing the number of times of access, and an address of the next related file are included in the structure of the related file data 52. A related file has a higher possibility of being accessed the larger the counter value is, so the related file is preferentially loaded into the cache 36.

Returning to the explanation of FIG. 2, the server 3 has a client manager 30, an application program 35, a cache 36 and a file storage unit 37. The client manager 30 has a communication controller 31 and a file manager 32 that includes an access controller 33 and a look-ahead processing unit 34. The look-ahead processing unit 34 has an obtaining unit 341 and a cache processing unit 342.

The communication controller 31 executes processing for communication. The access controller 33 performs processing for controlling file access. The obtaining unit 341 performs processing for obtaining information of related files from the management server 1. The cache processing unit 342 performs processing for loading related files into the cache 36. The application program 35 performs processing of files stored in the file storage unit 37. The cache 36 is a disk cache reserved in a memory area for example. The file storage unit 37 is an area that is for storing files and is on, for example, a hard disk.

Next, operation of the system illustrated in FIG. 2 will be explained using FIG. 7 to FIG. 19. First, operation when the application program 35 performs access to a file will be explained using FIG. 7 to FIG. 14.

Figure 7:
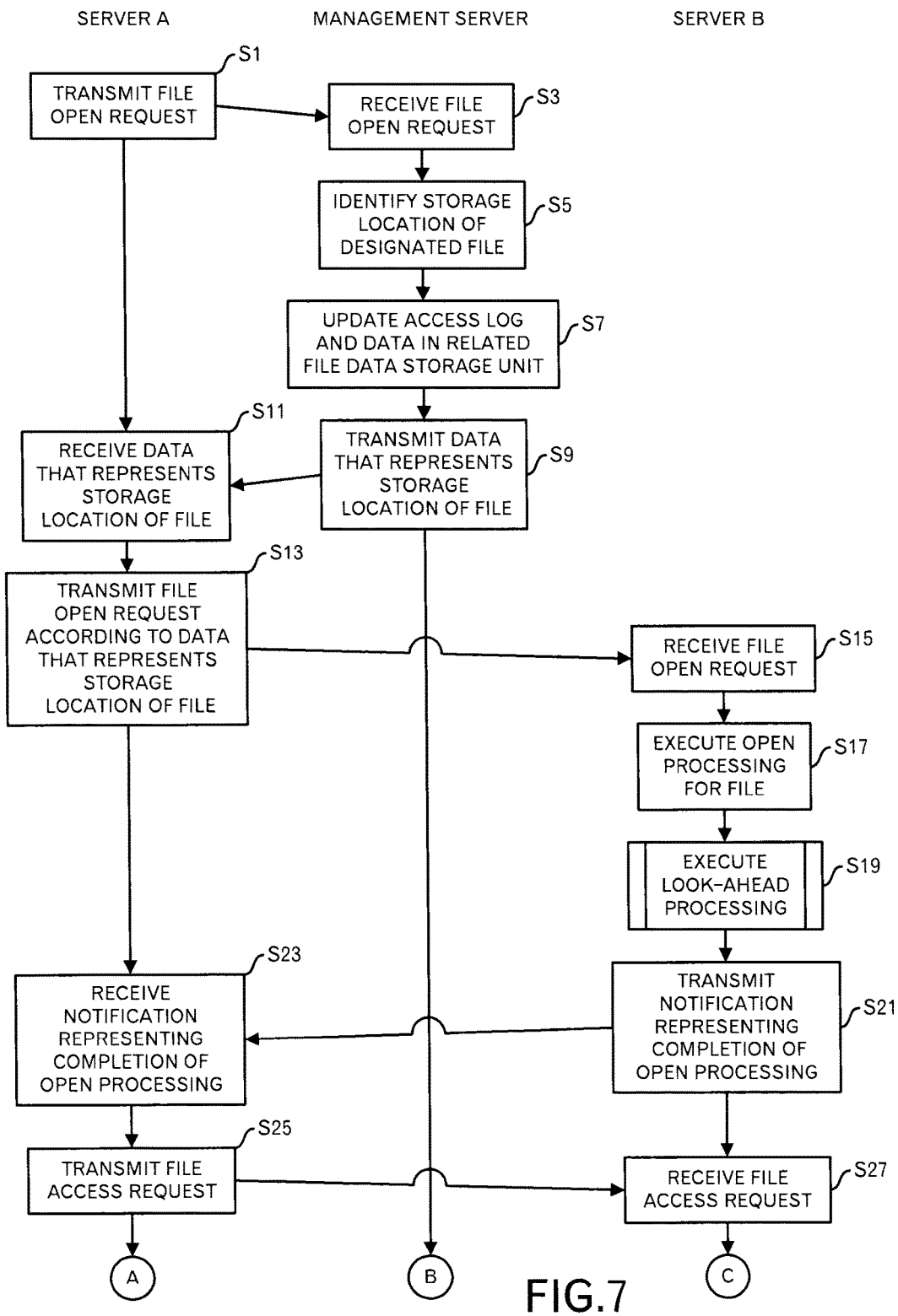
FIG. 7 is a diagram depicting a processing flow of processing performed when an application program performs access of a file.

Assume that the application program 35 performs access to a certain file on one of the servers 3 of the plural servers 3 of the system illustrated in FIG. 2 (here, this will be a server A). In that case, the application program 35 in the server A transmits a file open request that includes a designation for the file to be accessed to the management server 1 (FIG. 7: step S1).

The communication controller 101 of the management server 1 receives the file open request from the server A (step S3) and outputs the file open request to the file manager 104. The index manager 105 of the file manager 104 identifies a storage location of the file designated in the file open request using the file index 50 (step S5). The index manager 105 outputs data representing the storage location of the file to the communication controller 101.

The file manager 104 updates an access log that is stored in the log storage unit 109 and data that is stored in the related file data storage unit 108 (step S7). More specifically, the statistical data manager 107 of the file manager 104 updates the access log by adding data for the current access to the access log. Moreover, the statistical data manager 107 updates the data stored in the related file data storage unit 108 so as to reflect the updated access log.

The communication controller 101 transmits the data received from the index manager 105 that represents the storage location of the file to the server A (step S9).

The application program 35 of the server A receives the data representing the storage location of the file from the management server 1 (step S11). Then, the application program 35 transmits a file open request that includes a designation for a file to be accessed according to the data that represents the storage location of the file (here, the storage location is a server B) to the server B (step S13).

The server B receives the file open request from the server A (step S15). The access controller 33 of the server B then executes processing to open the file designated in the file open request (in other words, processing for starting to use the file), and loads the file into the cache 36 (step S17). The file that is designated in the file open request is read from the file storage unit 37.

Then, the look-ahead processing unit 34 executes a look-ahead processing (step S19). The look-ahead processing will be explained using FIG. 8A to FIG. 10.

Figure 8A:
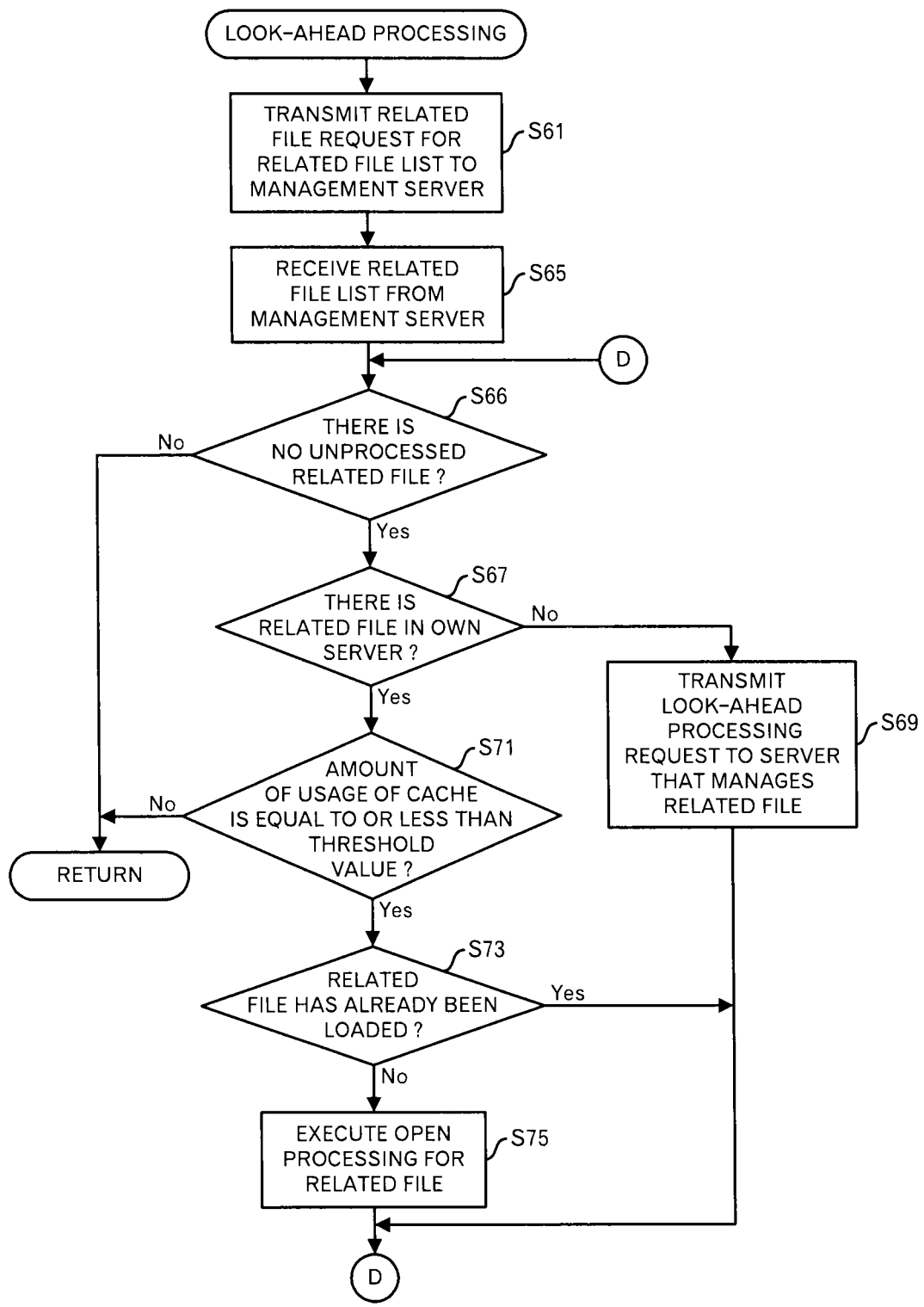
FIG. 8A is a diagram depicting a processing flow of look-ahead processing.

First, the look-ahead processing unit 34 transmits a related file request to request a related file list for the file to be accessed to the management server 1 (FIG. 8A: step S61).

Figure 8B:
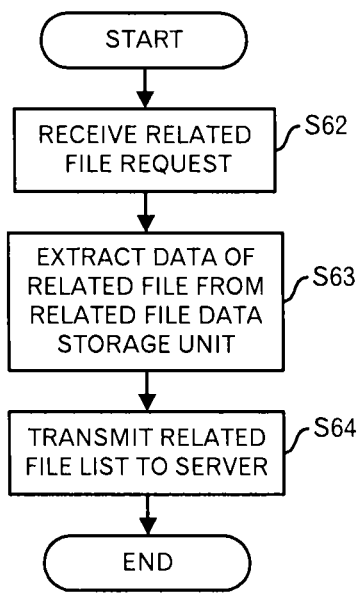
FIG. 8B is a diagram depicting the processing flow of look-ahead processing.

The processing by the management server 1 that received the related file request will be explained using FIG. 8B. The communication controller 101 of the management server 1 receives a related file request from the server B (FIG. 8B: step S62). The communication controller 101 outputs the related file request to the file manager 104.

The file manager 104 extracts related file identifiers that correspond to the file to be accessed and the storage locations of the related files (in other words, the identifiers of the servers that manage the related files) from the related file data storage unit 108 (step S63). The file manager 104 outputs the related file identifiers and the identifiers of the servers that manage the related files to the communication controller 101. There may be plural related file identifiers and identifiers of servers that manage the related files. There also may not be any related files.

The communication controller 101 transmits the related file list that includes the related file identifiers and the identifiers of servers that manage the related files to the server B (step S64). The processing then ends.

From this processing, the look-ahead processing unit 34 of the server B receives a related file list from the management server 1 (step S65), and stores that list in a storage device such as main memory.

The look-ahead processing unit 34 determines whether there are any unprocessed related files in the related file list (step S66). When there are no unprocessed related files (step S66: NO route), processing returns to the original processing. When there are unprocessed related files (step S66: YES route), the look-ahead processing unit 34 identifies one of the unprocessed related files and determines whether that related file is located on the look-ahead processing unit's own server (i.e., the server B) (step S67). The judgment in the step S67 is performed according to whether or not the identifier of the server that manages the related file represents the look-ahead processing unit's own server. The related file that is identified in the step S67 is referred to as "related file to be processed".

When the related file to be processed is not on the look-ahead processing unit's own server (step S67: NO route), the look-ahead processing unit 34 transmits a look-ahead processing request to the server that manages the related file to be processed (here, this will be a server C) (step S69). The server C executes a look-ahead processing (step S19) in accordance with the look-ahead processing request in the step S69. Processing then returns to the step S66 by way of terminal D.

On the other hand, when the related file to be processed is on the look-ahead processing unit's own server (step S67: YES route), the look-ahead processing unit 34 determines whether an amount of usage of the cache 36 is equal to or less than a threshold value (step S71). When the amount of usage of the cache 36 is not equal to or less than the threshold value (step S71: NO route), there is a possibility that cache overflow will occur, so the related file to be processed is not loaded into the cache 36, and processing returns to the original processing. When the amount of usage of the cache 36 is equal to or less than the threshold value (step S71: YES route), the look-ahead processing unit 34 determines whether the related file to be processed has been loaded into the cache 36 (step S73).

When the related file to be processed has already been loaded into the cache 36 (step S73: YES route), the related file to be processed does not have to be loaded into the cache 36, so the processing returns to the step S66 by way of terminal D. On the other hand, when the related file to be processed has not been loaded into the cache 36 (step S73: NO route), the look-ahead processing unit 34 requests the access controller 33 to execute open processing for the related file to be processed. In response to the request, the access controller 33 executes open processing for the related file to be processed (step S75). Then, processing returns to the step S66 by way of the terminal D.

By executing processing such as described above, when there is access to a specific file, the files related to that specific file are loaded into the cache 36. The related files are files having a high possibility of being accessed when the specific file is accessed, so it is possible to improve a cache hit rate in the distributed processing system.

Figure 9:
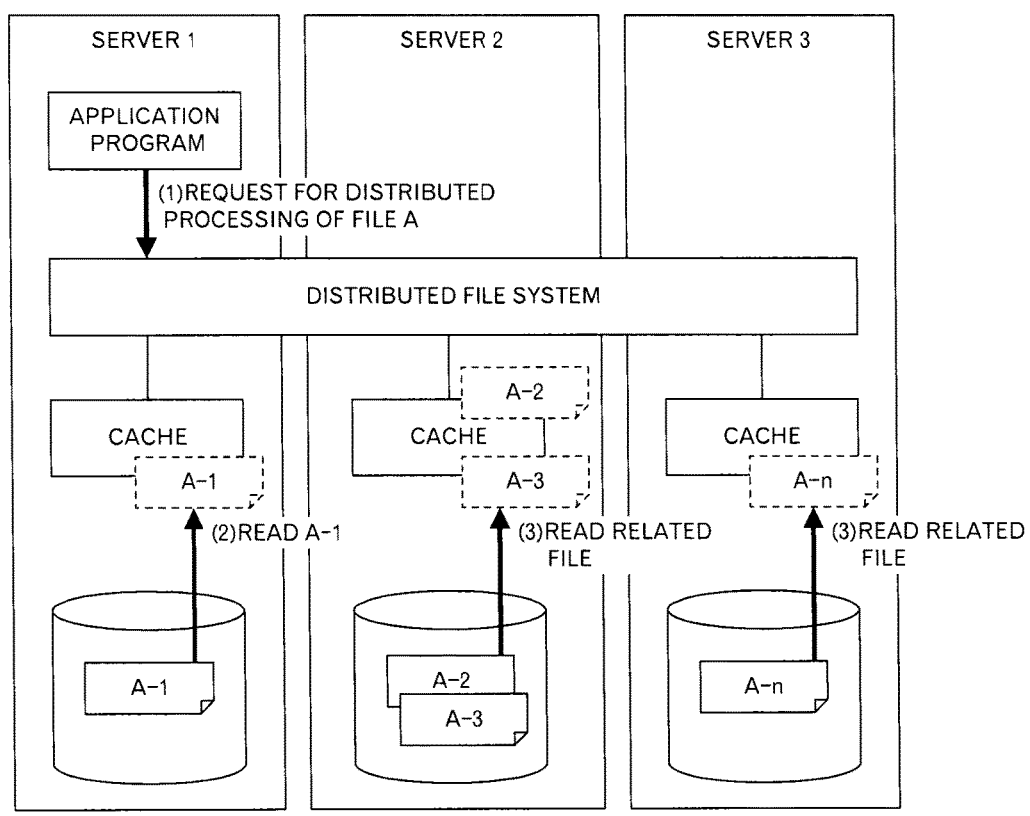
FIG. 9 is a diagram for explaining the look-ahead processing.

The look-ahead processing will be explained in detail using FIG. 9. For example, assume that the application program 35 on the server 1 requests distributed processing of file A (FIG. 9, (1)). The file A is divided into n number of files A-1, A-2, . . . , A-n (where n is a natural number equal to 2 or more) by the distributed file system, and the divided files are distributed and stored on servers 1 to 3. Here, file A-1 is loaded into the cache 36 from the file storage unit 37 of server 1, and provided to the processing by the application program 35 (FIG. 9 (2)). When doing this, file A-2 and file A-3 on the server 2, and file A-n on the server 3 are also loaded into the cache 36 (FIG. 9, (3)). Therefore, when the application program 35 performs processing of file A-2 to file A-n, these files are loaded beforehand into the cache 36, so disk I/O does not occur. Consequently, it becomes possible to perform processing of the file A at high speed.

Figure 10:
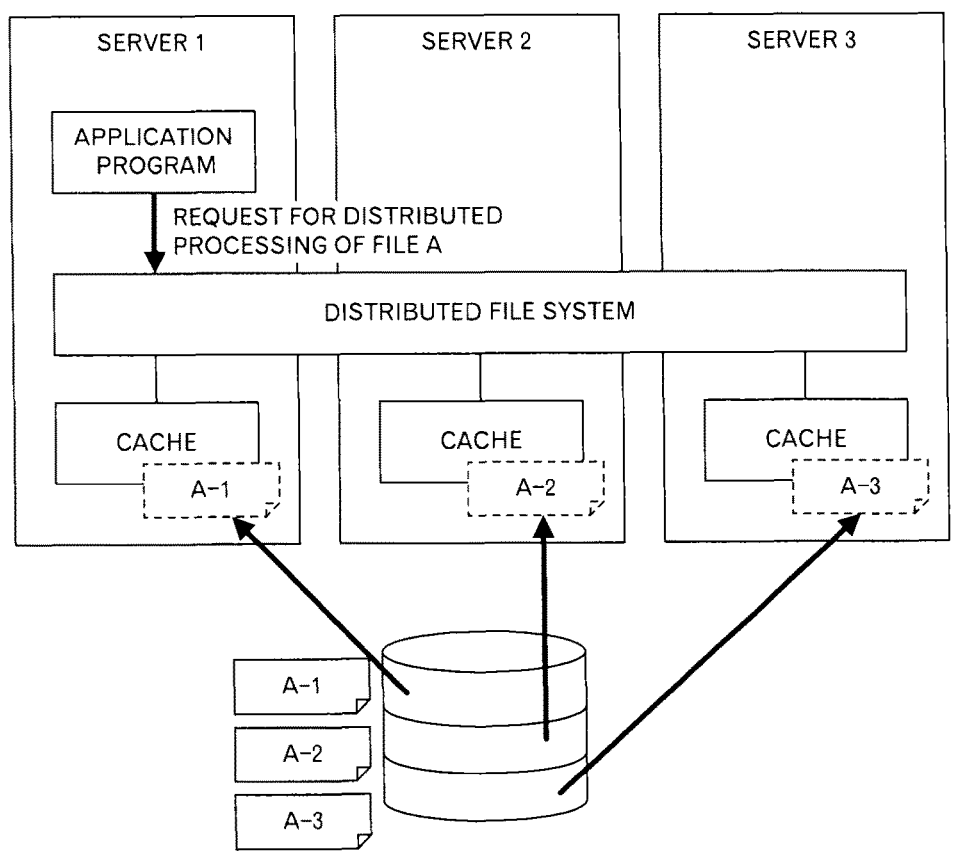
FIG. 10 is a diagram for explaining the look-ahead processing in a case of shared disk type.

In the explanation described above, each server was explained as having a file storage unit 37, however, as illustrated in FIG. 10, the look-ahead processing is effective even when only one shared file storage unit 37 is provided for plural servers (hereafter, referred to as the case of the shared disk type). In the example in FIG. 10, the file storage unit 37 is divided into three parts. In this case, when one of the files A-1 to A-3 is accessed, one of the servers of server 1 to the server 3 reads a file from the shared file storage unit 37, and loads the file into the cache 36. As a result, disk I/O no longer occurs, so it becomes possible to perform processing of the file A at high speed. The server that performs loading into the cache 36 is set, for example, by the distributed file system based on a round robin or based on the usage of the cache 36 or the like.

Returning to the explanation of FIG. 7, the communication controller 31 of the server B transmits a notification to the server A that represents that open processing has ended (step S21).

After receiving the notification representing the end of the open processing (step S23), the application program 35 of the server A transmits a file access request (for example, a reference request) to the server B for the file for which the open processing was performed (step S25).

The communication controller 31 of the server B receives the file access request (step S27). The communication controller 31 outputs the file access request to the file manager 32. The processing then moves to the processing in FIG. 11 by way of terminals A to the C.

Figure 11:
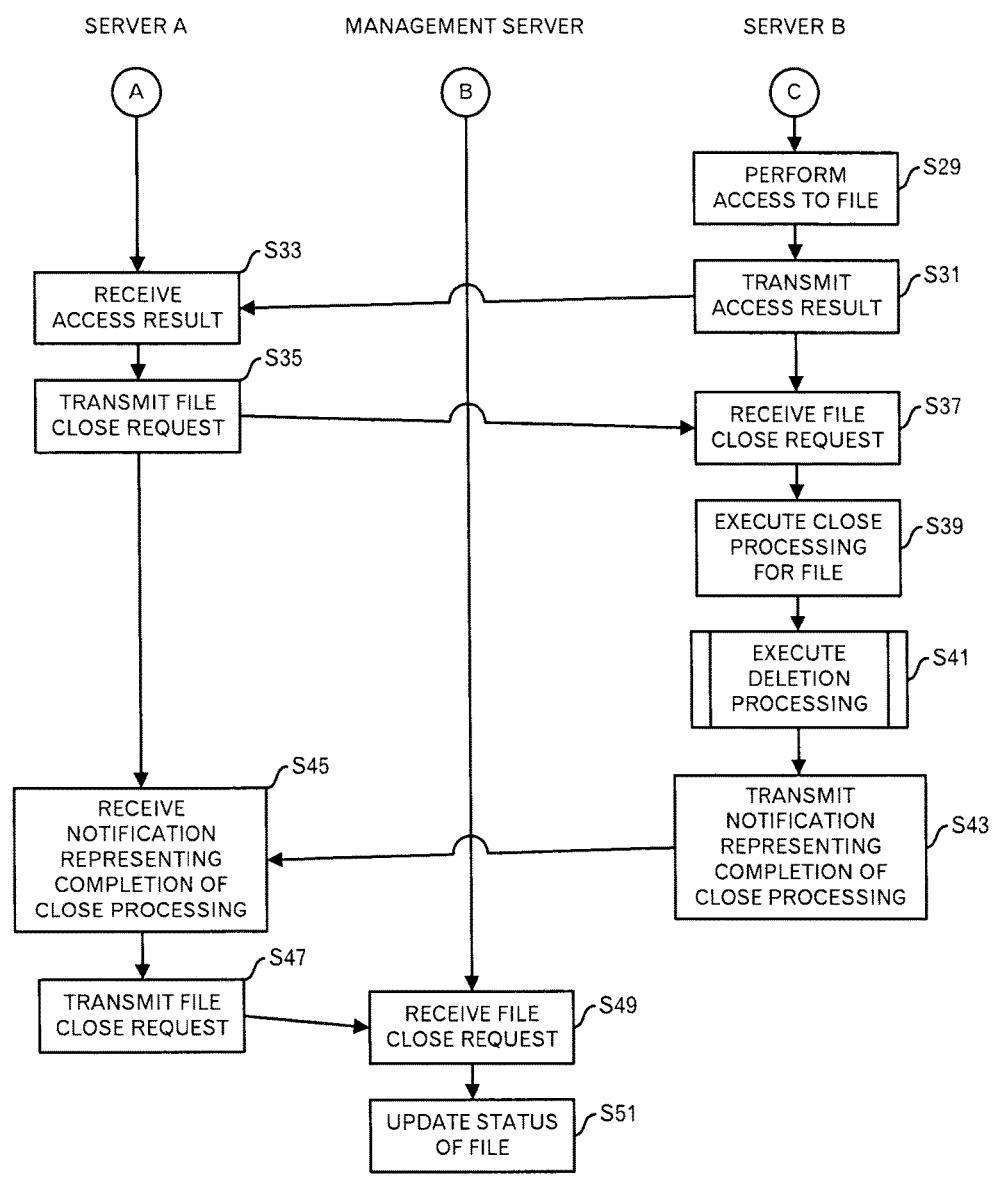
FIG. 11 is a diagram depicting a processing flow of processing performed when the application program performs access of a file.

Shifting to an explanation of FIG. 11, the access controller 33 of the file manager 32 performs access to a file stored in the file storage unit 37 (step S29). The access controller 33 outputs an access result (for example, when the file access request is a reference request, outputs a reference result) to the communication controller 31.

The communication controller 31 transmits the access result to the server A, which was the transmission source of the file access request (step S31).

The application program 35 of the server A receives the access result (step S33). After that, the application program 35 transmits a file close request for a file to be accessed to the server B (step S35).

The communication controller 31 of the server B receives the file close request (step S37). The communication controller 31 outputs the file close request to the file manager 32.

The access controller 33 of the file manager 32 executes close processing for the file to be accessed (in other words, executes a process for ending use of the file) (step S39). Moreover, the look-ahead processing unit 34 of the file manager 32 executes deletion processing (step S41). The deletion processing will be explained using FIG. 12 and FIG. 13.

Figure 12:
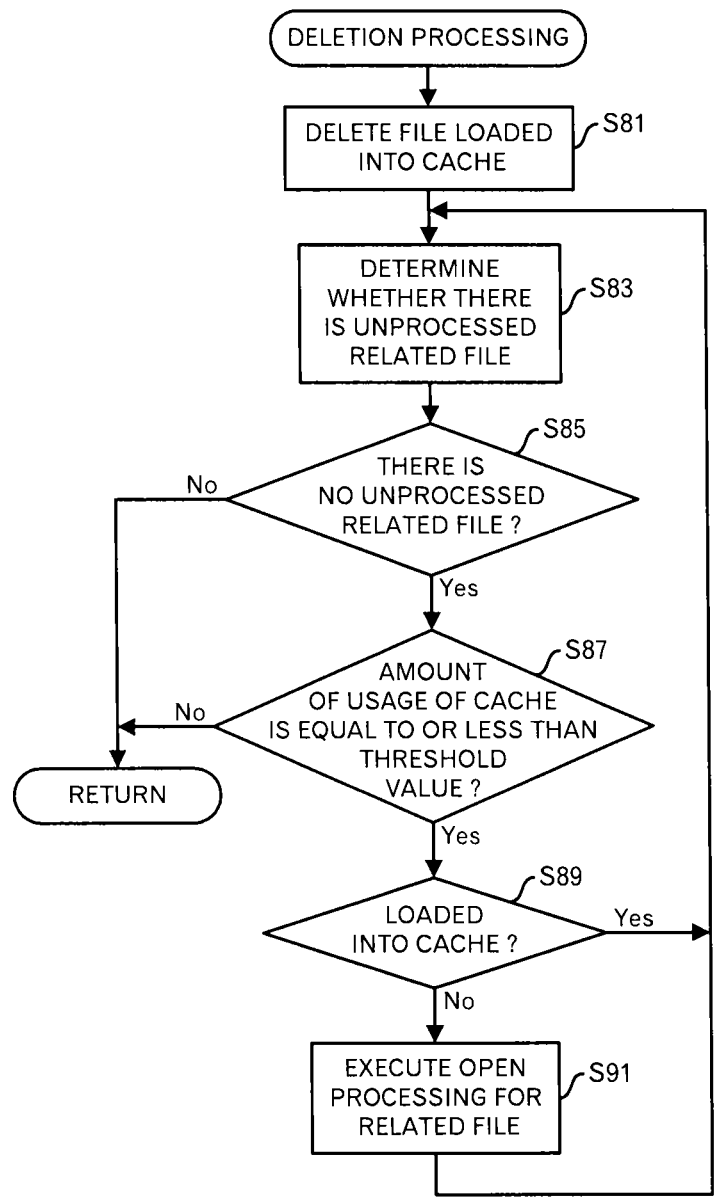
FIG. 12 is a diagram depicting a processing flow of cancellation processing.

First, the look-ahead processing unit 34 deletes the file to be accessed that is loaded into the cache 36 (FIG. 12: step S81).

The look-ahead processing unit 34 determines whether there are any unprocessed related files that are related files managed by the look-ahead processing unit's own server in the related file list received in the step S65 (step S83).

When there are no unprocessed related files (step S85: NO route), the processing returns to the original processing. On the other hand, when there is an unprocessed related file (step S85: YES route), the look-ahead processing unit 34 identifies one unprocessed related file. (Hereafter, the identified file will be called "related file to be processed"). The look-ahead processing unit 34 then determines whether an amount of usage of the cache 36 is equal to or less than a threshold value (step S87).

When the amount of usage of the cache 36 is not equal to or less than the threshold value (step S87: NO route), the related file to be processed is not loaded into the cache 36, so the processing returns to the original processing. On the other hand, when the amount of usage of the cache 36 is equal to or less than the threshold value (step S87: YES route), the look-ahead processing unit 34 determines whether the related file to be processed has already been loaded into the cache 36 (step S89).

When the related file to be processed has already been loaded into the cache 36 (step S89: YES route), the related file to be processed does not have to be loaded into the cache 36, so processing returns to the step S83. However, when the related file to be processed has not been loaded into the cache 36 (step S89: NO route), the look-ahead processing unit 34 requests the access controller 33 to execute open processing for the related file to be processed. In response to this, the access controller 33 executes open processing for the related file to be processed (step S91). The processing then returns to the step S83.

Figure 13:
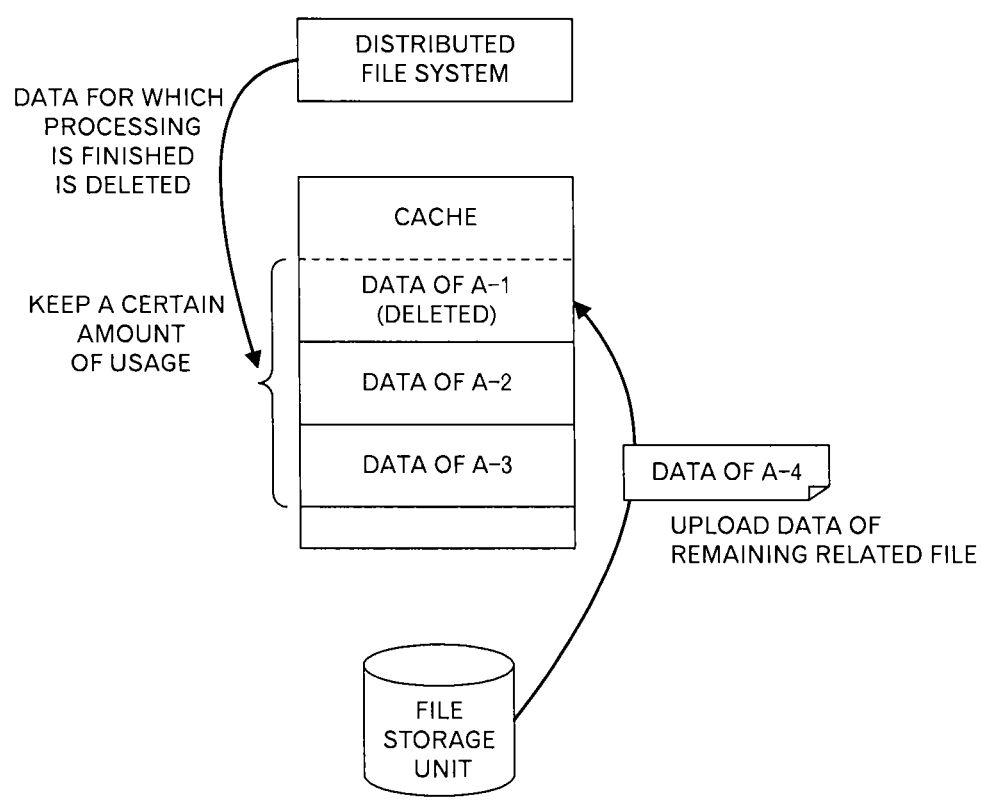
FIG. 13 is a diagram for explaining the cancellation processing.
Figure 14:
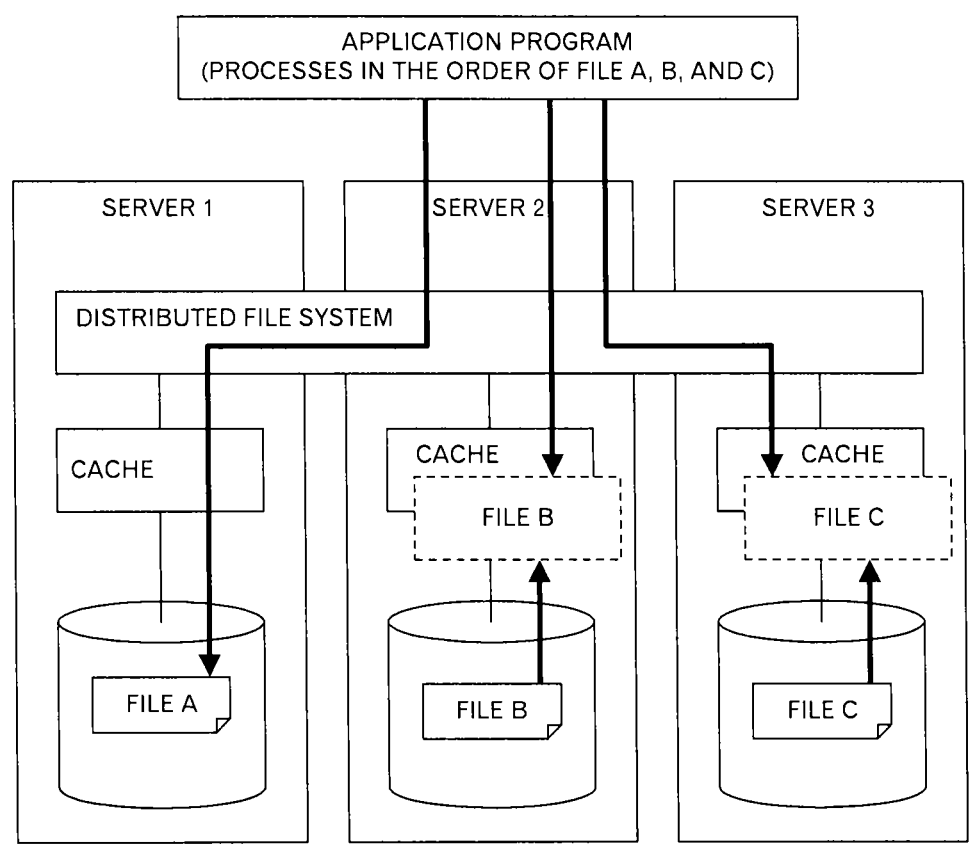
FIG. 14 is a diagram for explaining improvement of a cache hit rate.

By executing processing such as described above, the file for which close processing has been ended is deleted from the cache 36, so the cache 36 is not used uselessly. Moreover, as illustrated in FIG. 13, the amount of usage of the cache 36 is controlled so as to be equal to or less than a threshold value. In the example illustrated in FIG. 13, file A-1 for which processing is finished is deleted from the cache 36, and in its place, related file A-4 is loaded into the cache 36. In this way, it becomes easy for unprocessed related files to be loaded into the cache 36, so it is possible to further improve the cache hit rate.

Returning to the explanation of FIG. 11, the communication controller 31 of the server B transmits a notification representing that the close processing is finished to the server A (step S43).

The application program 35 of the server A receives the notification representing the end of the close processing from the server B (step S45). The application program 35 then transmits a file close request for the file to be accessed to the management server 1 (step S47).

The communication controller 101 of the management server 1 receives the file close request from the server A (step S49) and outputs the request to the file manager 104. The file manager 104 then updates status of the file to be accessed (here, this means information on the status) (step S51). More specifically, the file manager 104 updates open or close state, lock state, file size, update date and time and the like for the file to be accessed, and stores that information in a storage device (not illustrated in the figure).

By executing processing such as described above, it is possible to improve the cache hit rate of a distributed processing system, and perform processing of a file at high speed.

Figure 1:
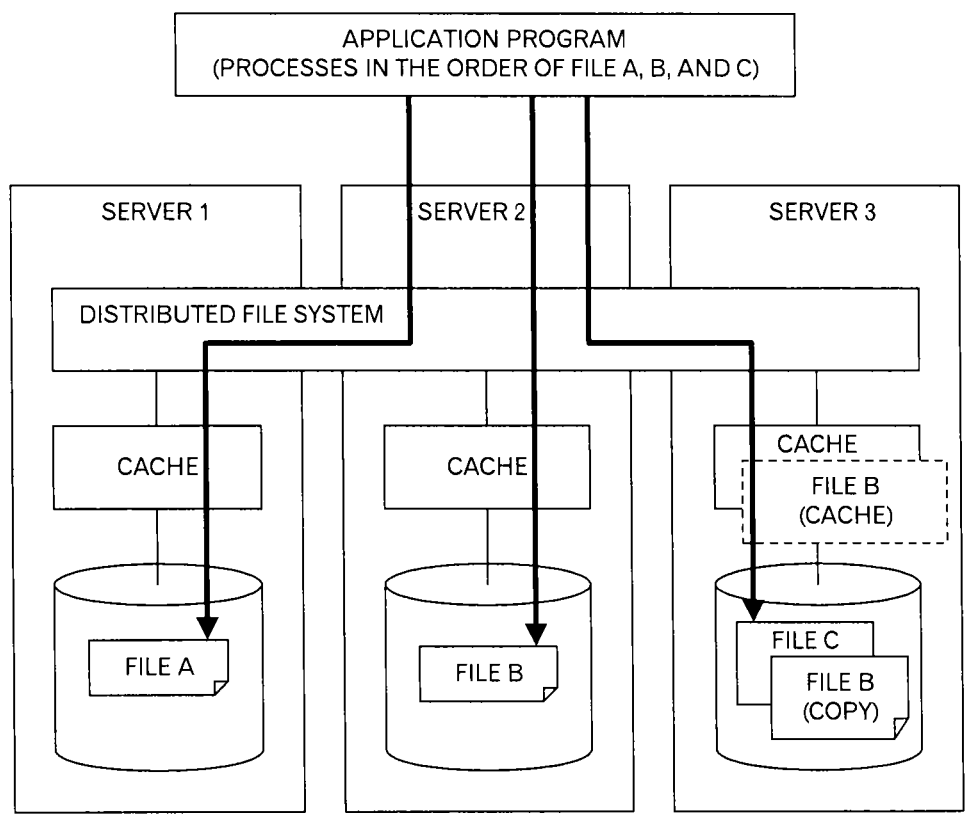
FIG. 1 is a diagram for explaining processing of big data by a distributed processing system.

Typically, the cache is refreshed independently of a condition of the application program. However, in the embodiment described above, it is easy for related files to remain in the cache, so processing files at high speed can be expected. The case of performing the processing of this embodiment under the same conditions as those in FIG. 1 will be explained using FIG. 14. With the processing of this embodiment, there is a high possibility that the file B will be loaded into the cache 36 when the application program 35 accesses the server 2, and there is a high possibility that the file C will be loaded into the cache 36 when the application program 35 accesses the server 3. Therefore, there is a low possibility that disk I/O will occur for the file B and the file C, so it is possible to shorten the time for completing processing of the files.

As a known method of improving the speed of data processing, there is a method of maintaining a memory area for the application program (hereafter, referred to as an application cache) that is separate from the cache for the OS, loading data beforehand into that area, and then accessing that data. With this method, by using a unique memory area, it is possible to more completely control selection of data, so effective access is possible. However, even though the application cache is provided, this does not mean that the OS cache is eliminated, so the memory area is doubly used.

On the other hand, in the case of the method explained for this embodiment, an amount of memory usage can be conserved by approximately ½ when compared with a method of using the application cache.

Figure 15:
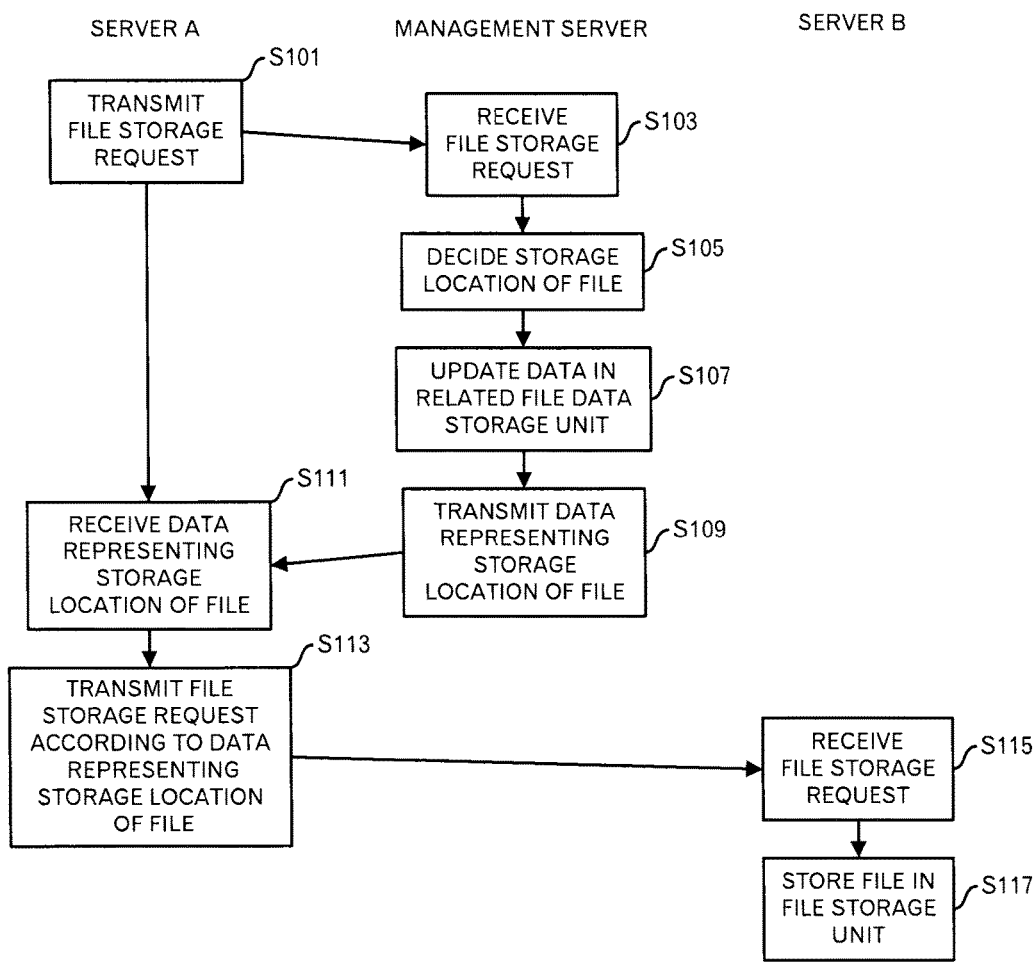
FIG. 15 is a diagram depicting a processing flow of processing performed when storing files.

Next, the operation when storing files will be explained using FIGS. 15 to 17. The flowchart in FIG. 15 illustrates the main points of the processing, and processing that is performed in a typical distributed file system (for example, status update, locking files, managing the cluster configuration and the like) will be omitted.

First, the file manager 32 of the server 3 (here, this will be a server A) generates a file storage request for requesting to divide and store a file when, for example, the file was generated by the application program 35. Then, the file manager 32 transmits the file storage request to the management server 1 (FIG. 15: step S101). It is possible to include the file itself, or to include file size information and the like in the file storage request.

After receiving the file storage request (step S103), the communication controller 101 of the management server 1 outputs the file storage request to the file manager 104.

The file manager 104 sets a storage location for the file for which storage was requested in the file storage request (step S105). For example, a server having a file storage unit 37 with a large amount of available capacity is set as the storage location. Moreover, when the file size is large, the file is divided, so plural servers are set as storage locations for the file.

The file manager 104 updates the data that is stored in the related file data storage unit 108 (step S107). In the step S107, the related file data is updated based on a configurational relation. For example, when a file is stored in a certain directory, other files that are stored in that directory have a configurational relation, so update is performed based on a new configurational relation. Moreover, when a file is divided, the plural files after division have a configurational relation, so update is performed based on a new configurational relation.

The file manager 104 outputs data representing the file storage location to the communication controller 101 (step S109). The communication controller 101 then transmits the data representing the file storage location (here, this is data representing the server B) to the server A.

After receiving the data representing the file storage location (step S111), the file manager 32 of the server A transmits a file storage request to the server B according to the data representing the file storage location (step S113). The file storage request that is transmitted in the step S113 includes the file. When plural servers are the file storage locations, the file manager 32 transmits file storage requests to the plural servers.

The communication controller 31 of the server B receives the file storage request (step S115). The communication controller 31 outputs the file storage request to the access controller 33.

The access controller 33 stores the file that is included in the file storage request to the file storage unit 37 (step S117).

By executing processing as described above, it is possible to update the related file data based on the configurational relation of files when storing the file in the file storage unit 37.

Updating the related file data based on the configurational relation of files will be explained in detail using FIG. 16. For example, assume that an application program 35 of a server outputted a file storage request for file A. The file A is divided into three files, file A1, file A-2 and file A-3 by the distributed file system, and the divided files are distributed and stored in servers 1 to 3. Moreover, assume that the file A-1 is stored in the file storage unit 37 of server 1 in the same directory as file B-1, the file A-2 is stored in the file storage unit 37 of the server 2 in the same directory as file B-2, and the file A-3 is stored in the file storage unit 37 of the server 3 in the same directory as file B-3. In a case such as this, the related file data storage unit 108 of the management server 1 is updated, for example, to the state illustrated by 160 in FIG. 16. In this example, the related files of the file A-1 are the file A-2, the file A-3 and the file B-1, the related files of the file A-2 are the file A-1, the file A-3 and the file B-2, and the related files of the file A-3 are the file A-1, the file A-2 and the file B-3.

Figure 16:
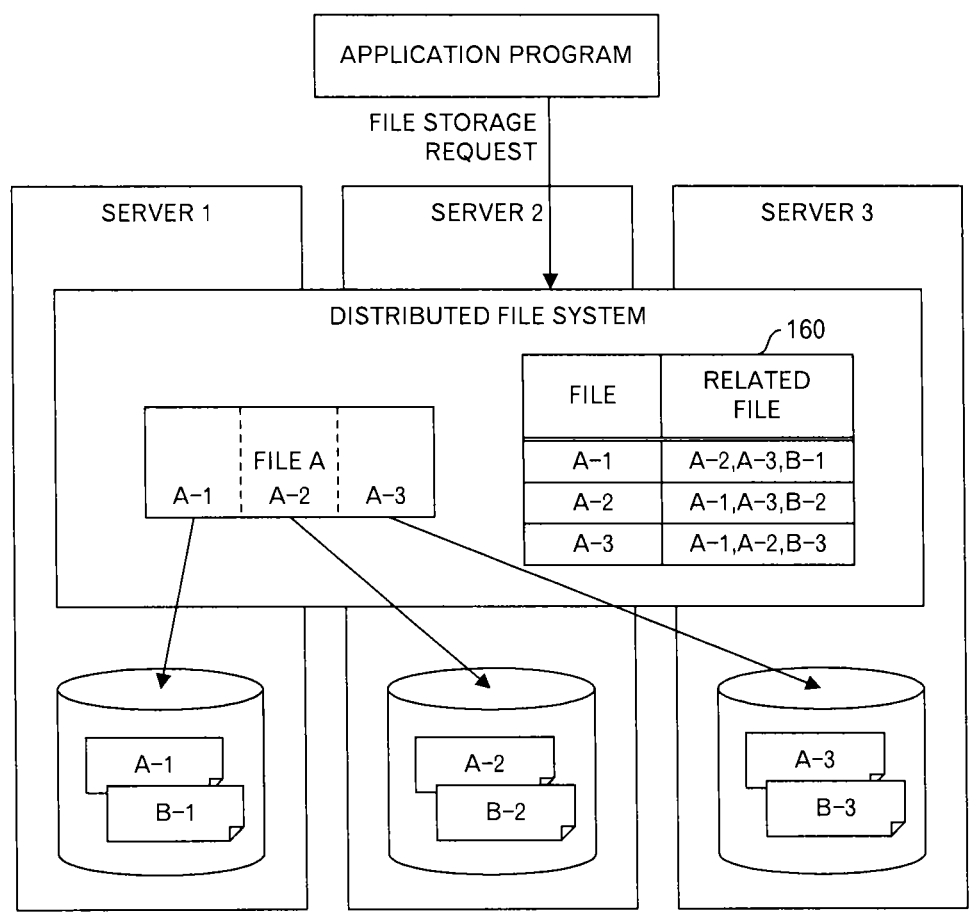
FIG. 16 is a diagram for explaining a file storage request.
Figure 17:
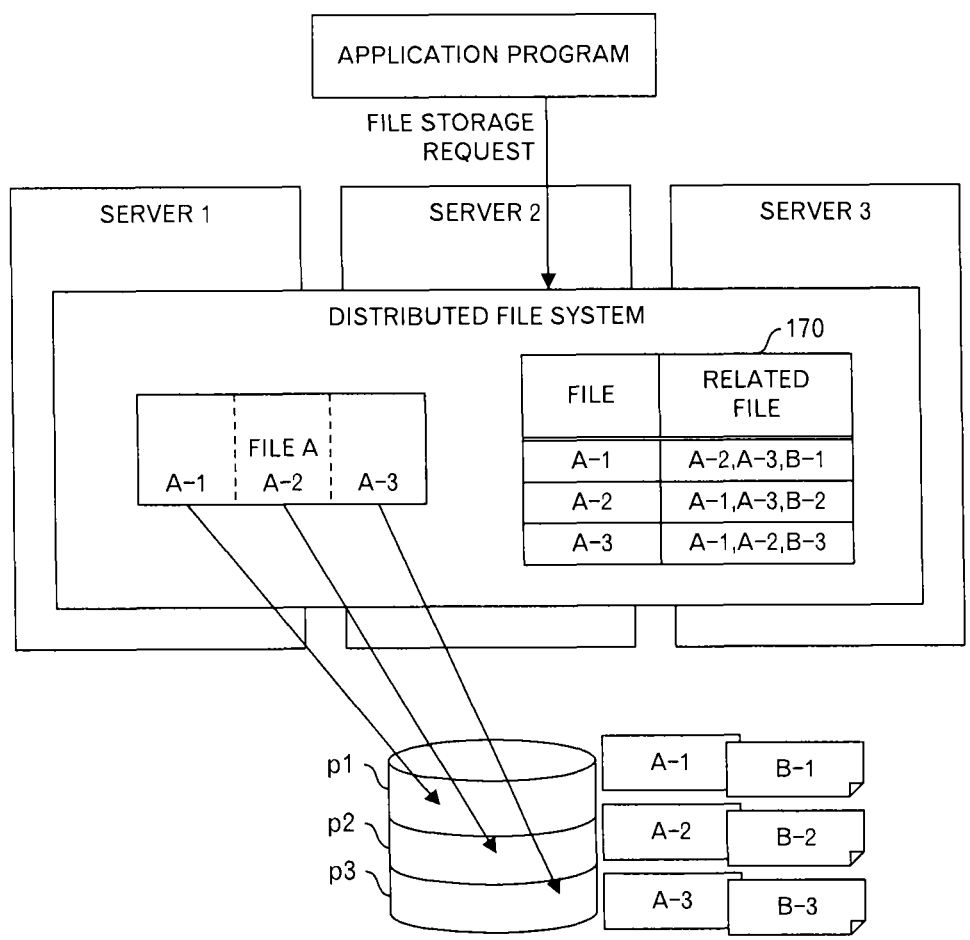
FIG. 17 is a diagram for explaining the file storage request in the case of shared disk type.

In FIG. 16, the file B-2 and the file B-3 are not included in the related files of the file A-1, and the related files are limited to the file B-1 that is stored in the same directory. This is because, in the case that the split files of the file B-1 (here, these are the file B-2 and the file B-3) were also related files, the number of related files of the file A-1 would become very large. This is the same for the file A-2 and the file A-3.

Moreover, in the case of the shared disk type files as well, it is possible to similarly perform update of the related file data based on the configurational relation of the file. For example, as illustrated in FIG. 17, assume that one shared file storage unit 37 is provided for plural servers, and the file storage unit 37 is divided into three portions. The file A is divided by the distributed file system into three files, file A-1, file A-2 and file A-3, and the divided files are distributed and stored in portions p1 to p3 of the shared file storage unit 37. Moreover, assume that the file A-1 is stored in portion p1 of the file storage unit 37 in the same directory as file B-1, the file A-2 is stored in portion p2 of the file storage unit 37 in the same directory as file B-2, and the file A-3 is stored in portion p3 of the file storage unit 37 in the same directory as file B-3. In a case such as this as well, the related file data storage unit 108 of the management server 1 is updated to the state illustrated by 170 in FIG. 17. In other words, the related files of the file A-1 are the file A-2, the file A-3 and the file B-1, the related files of the file A-2 are the file A-1, the file A-3 and the file B-2, and the related files of the file A-3 are the file A-1, the file A-2 and the file B-3.

Figure 18:
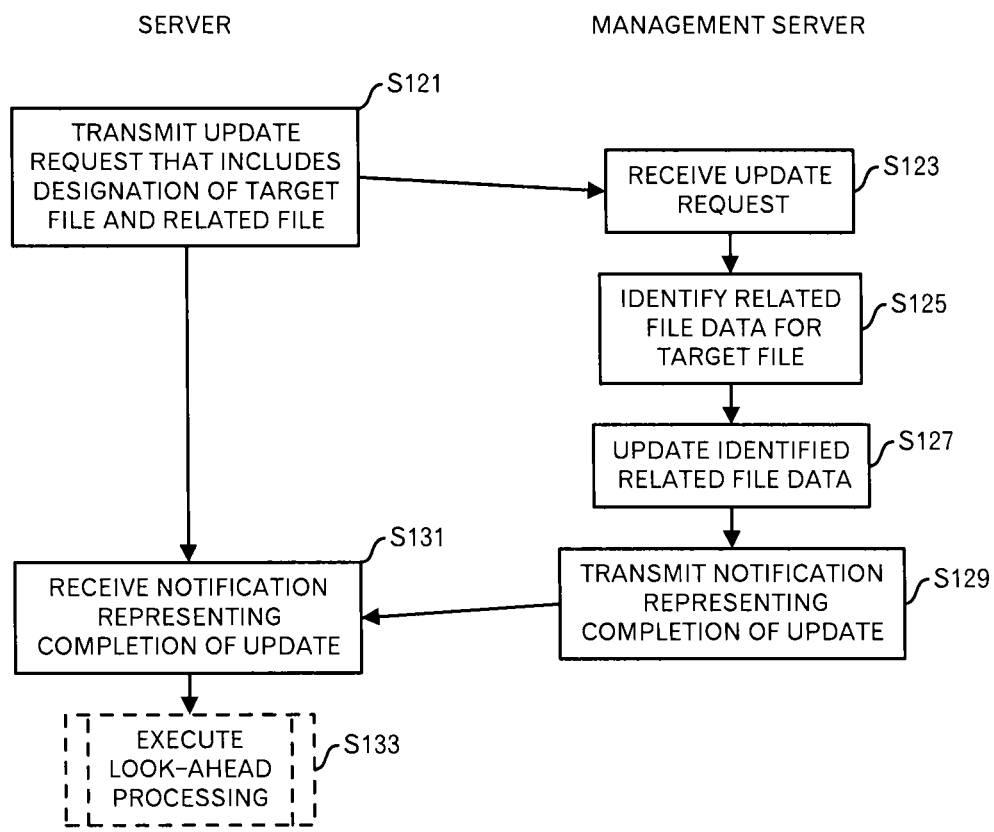
FIG. 18 is a diagram depicting a processing flow of processing performed when a user designates a relation.

Next, operation in the case that a user designates a relation will be explained using FIG. 18.

First, the user uses an input device (for example, a keyboard, a mouse, or the like) of the server 3 to input a target file and related files that are related to the target file. The file manager 32 of the server 3 accepts the designation for the target file and the related files. The file manager 32 then transmits an update request that includes the designation for the target file and the related files to the management server 1 (FIG. 18: step S121).

The communication controller 101 of the management server 1 receives the update request from the server 3 (step S123), and outputs the update request to the file manager 104.

The file manager 104 identifies, from the related file data storage unit 108, related file data for the target file that was designated in the update request (step S125). The file manager 104 then generates related file data according to the user designation in the update request, and updates the identified related file data according to the generated related file data (step S127). When there is no related file data for the designated target file in the related file data storage unit 108, the generated related filed data is stored in the related file data storage unit 108.

The file manager 104 outputs a notification representing completion of update to the communication controller 101. The communication controller 101 then transmits the notification representing completion of update to the server 3 (step S129).

The communication controller 31 of the server 3 receives the notification representing completion of update from the management server 1 (step S131). The communication controller 31 then outputs the notification representing completion of update to the file manager 32.

The look-ahead processing unit 34 of the file manager 32 executes look-ahead processing (step S133). The look-ahead processing is as explained using FIG. 8A to FIG. 10. The reason for executing the look-ahead processing in this kind of timing is because it is considered that often a file is immediately processed when a user designates a relation.

By executing processing as described above, it becomes possible to adequately reflect the user's intention to the related file data storage unit 108.

Figure 19:
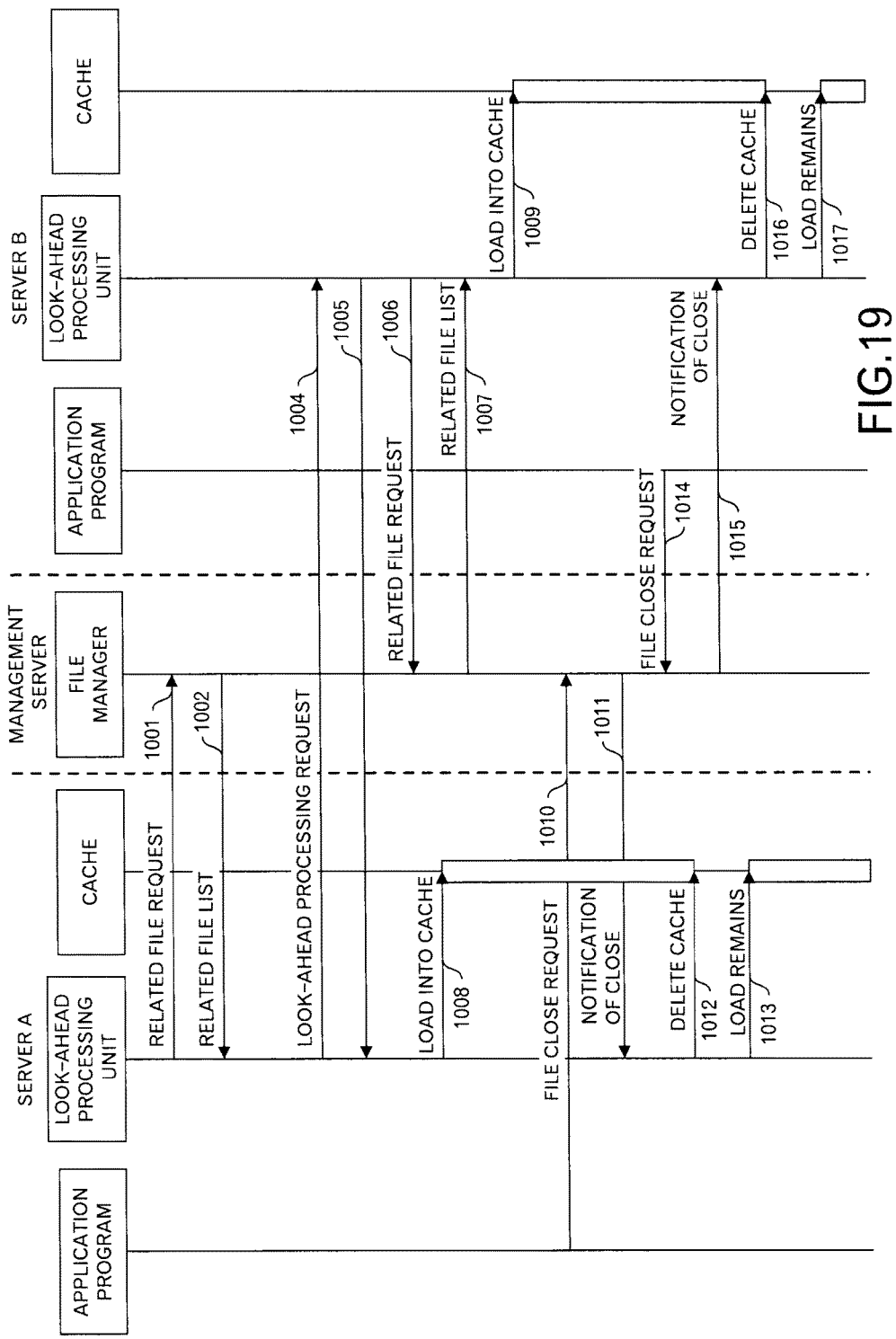
FIG. 19 is a diagram depicting an example of a lifecycle of a cache.

FIG. 19 illustrates an example of a life cycle of a cache. The example in FIG. 19 illustrates the life cycle of the caches 36 of the server A and the server B. In FIG. 19, a time period in which a file is loaded into the cache 36 are represented by white rectangles.

For example, when a certain file on the server A is accessed, the look-ahead processing unit 34 of the server A transmits a related file request to the management server 1 (FIG. 19: 1001). In response to this, the file manager 104 of the management server 1 transmits a related file list to the server A (FIG. 19: 1002). Here, the related file list includes identification information for files managed by the server A, and identification information for files managed by the server B.

The look-ahead processing unit 34 of the server A transmits a look-ahead processing request to the server B (FIG. 19: 1004). The look-ahead processing unit 34 of the server B receives the look-ahead processing request and returns a response (FIG. 19: 1005).

The look-ahead processing unit 34 of the server B transmits a related file request to the management server 1 (FIG. 19: 1006). In response to this, the file manager 104 of the management server 1 transmits the related file list to the server B (FIG. 19: 1007).

On the other hand, the look-ahead processing unit 34 of the server A loads the related files that are managed by the server A into the cache 36 (FIG. 19: 1008). Moreover, the look-ahead processing unit 34 of the server B loads the related files that are managed by the server B into the cache 36 (FIG. 19: 1009).

The application program 35 of the server A transmits a file close request to the management server 1 (FIG. 19: 1010). The file manager 104 of the management server 1 receives the file close request, then updates file status and notifies the server A that the close operation has been completed (FIG. 19: 1011).

The look-ahead processing unit 34 of the server A, when notified by the management server 1 that close operation has been completed, deletes files that were loaded into the cache 36 (FIG. 19: 1012). Moreover, the look-ahead processing unit 34 loads the remaining related files into the cache 36 (FIG. 19: 1013).

On the other hand, the application program 35 of the server B transmits a file close request to the management server 1 (FIG. 19: 1014). The file manager 104 of the management server 1 receives the file close request, and then updates file status and notifies the server B that the close operation has been completed (FIG. 19: 1015).

The look-ahead processing unit 34 of the server B, when notified by the management server 1 that the closing operation is completed, deletes the files that were loaded into the cache 36 (FIG. 19: 1016). Moreover, the look-ahead processing unit 34 loads the remaining related files into the cache 36 (FIG. 19: 1017).

By repeatedly performing processing such as described above, processing for files by the distributed processing system proceeds.

Although one embodiment of this technique was explained above, this technique is not limited to those. For example, the functional block configuration of the management server 1 and the server 3, which are explained above, do not always correspond to actual program module configurations.

Moreover, the respective formats of the aforementioned tables are mere examples, and may be changed. Furthermore, as for the processing flow, as long as the processing results do not change, the turns of the steps may be exchanged or the steps may be executed in parallel.

The file access request is not limited to the reference request although the reference request is given in the example described above. For example, a request to write in a file may be used.

Moreover, an example in which the server B obtains the related file list from the management server 1 in the flow illustrated in FIGS. 7 and 11. However, processing is not limited to that example. For example, the server A may receive the related file list when receiving information representing a storage location of a file from the management server 1 and may transmit the related file list to the server B.

Moreover, the management server 1 may further operate as the server 3 although an example in which the management server 1 operates as the server 3 is not explained.

Figure 20:
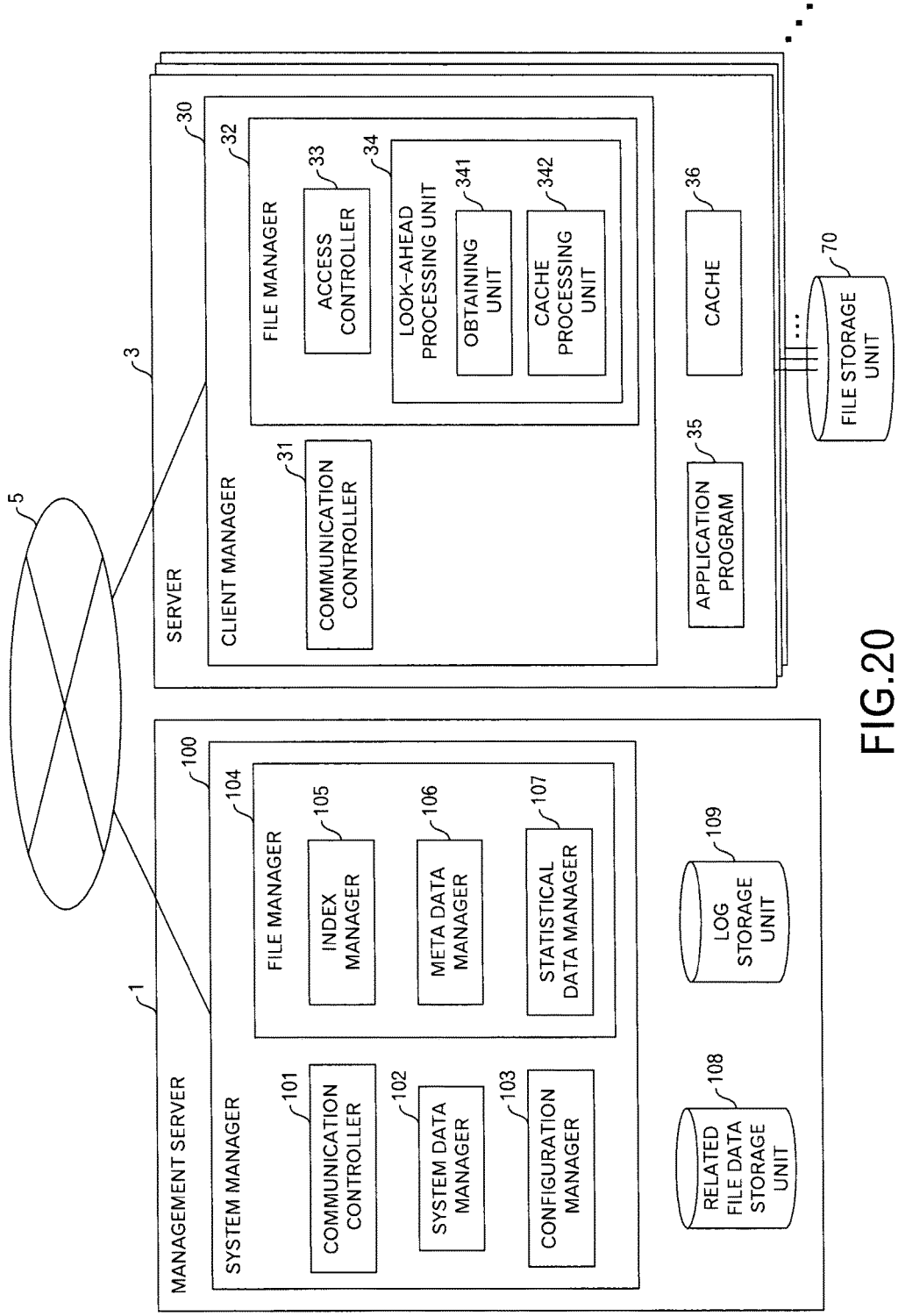
FIG. 20 is a diagram depicting another example of the system of this embodiment.

Moreover, as described above, processing in this embodiment may be applicable to the case of shared disk type. A system in the case of shared disk type may be, for example, a system illustrated in FIG. 20. More specifically, one file storage unit 70 may be set up for the plural servers 3.

Figure 21:
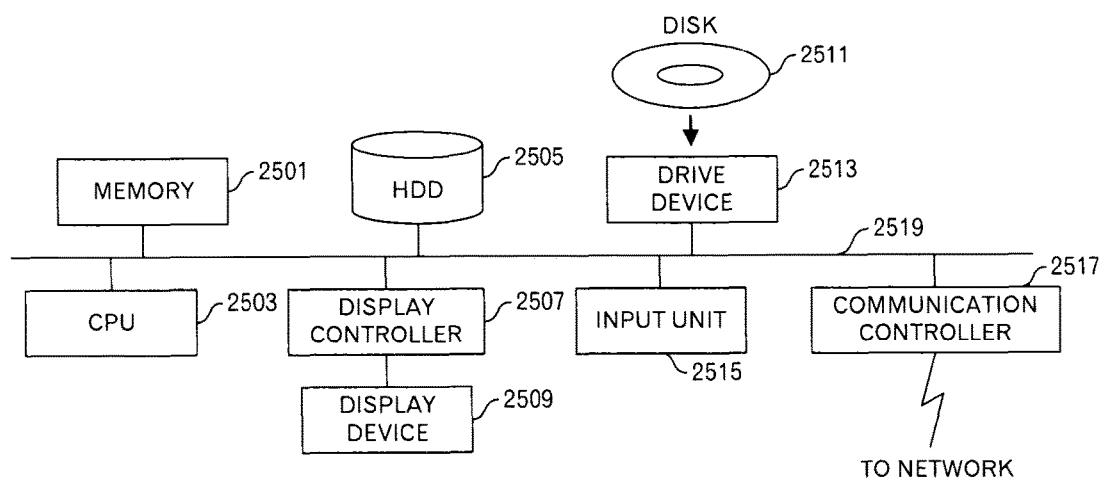
FIG. 21 is a functional block diagram of a computer.

In addition, the aforementioned management server 1 and the server 3 are computer devices as illustrated in FIG. 21. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as illustrated in FIG. 21. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned processing is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The aforementioned embodiment is summarized as follows:

An information processing method relating to a first aspect of this embodiment is executed in a distributed processing system that processes data by plural information processing apparatuses. And the information processing method includes: (A) obtaining, by a first information processing apparatus of the plural information processing apparatuses and from a second information processing apparatus that manages relations among data, identification information of first data that has a predetermined relation with second data and identification information of an information processing apparatus that manages the first data, upon detecting access to the second data managed by the first information processing apparatus; (B) reading out, by the first information processing apparatus, the first data, upon determining that the information processing apparatus that manages the first data corresponds to the first information processing apparatus; and loading, by the first information processing apparatus, the first data into a cache.

There is a high possibility that the timing at which the first data having the predetermined relation with the second data is accessed is near the timing at which the second data is accessed. Therefore, by performing processing as described above, it becomes possible to improve a cache hit rate in the distributed processing system.

Moreover, the information processing method may further include: (C) transmitting, by the first information processing apparatus, a first request to load the first data into the cache to the information processing apparatus that manages the first data, upon determining that the information processing apparatus that manages the first data does not correspond to the first information processing apparatus. By performing processing as described above, it becomes possible to handle a case where the first information processing apparatus does not manage the first data.

Moreover, the information processing method may further include: (D) deleting, by the information processing apparatus, the second data loaded into the cache, upon detecting that the access to the second data has ended. By performing processing as described above, it becomes possible to control occurrence of cache overflow.

Moreover, the aforementioned predetermined relation may be at least one of a relation among data contents, a storage location of data, a timestamp of the data, a relation based on history of access to the data, and a relation designated by a user.

An information processing method relating to a second aspect of this embodiment is executed in a distributed processing system that processes data by plural information processing apparatuses. And the information processing method includes: (E) extracting, by a first information processing apparatus of the plural information processing apparatuses, identification information of first data that has a predetermined relation with second data from a related data storage unit that stores data in association with identification information of the data and identification information of data that has the predetermined relation with the data, upon receiving a first request to request information for the first data that has the predetermined relation with the second data from a second information processing apparatus that manages the second data; (F) and transmitting, by the first information processing apparatus, the extracted identification information of the first data and identification information of an information processing apparatus that manages the first data to a transmission source of the first request.

By performing processing as described above, it becomes possible to improve a cache hit rate in the distributed processing system because the first data is to be loaded into the cache when the second data is accessed.

Moreover, the information processing method may further include: (G) updating, by the first information processing apparatus, data stored in the related data storage unit based on at least one of a relation among data contents, a storage location of data, and a timestamp of the data. It becomes possible to identify proper data as data that has a relation by updating based on these items, because these items relate to relations among data.

Moreover, the information processing method may further include: (H) updating, by the first information processing apparatus, data stored in the related data storage unit based on history of access to data in the distributed processing system. It becomes possible to identify proper data as data that has a relation by updating based on the history of access to data, because order of access or access patterns relate to relations among data.

Moreover, the information processing method may further include: (I) updating data stored in the related data storage unit according to a designation from a user, upon accepting the designation. By performing processing as described above, it becomes possible to load into the cache according to user's intension.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing method executed in a distributed processing system that processes data by a plurality of information processing apparatuses, comprising:
    obtaining, by a first information processing apparatus of the plurality of information processing apparatuses and from a second information processing apparatus that manages relations among data, identification information of first data that has a possibility to be accessed after second data is accessed and identification information of an information processing apparatus that manages the first data, upon detecting access to the second data managed by the first information processing apparatus;
    reading out, by the first information processing apparatus, the first data, upon determining that the information processing apparatus that manages the first data corresponds to the first information processing apparatus; and
    loading, by the first information processing apparatus, the first data into a cache.

2. The information processing method as set forth in claim 1, further comprising transmitting, by the first information processing apparatus, a first request to load the first data into the cache to the information processing apparatus that manages the first data, upon determining that the information processing apparatus that manages the first data does not correspond to the first information processing apparatus.

3. The information processing method as set forth in claim 1, further comprising deleting, by the first information processing apparatus, the second data loaded into the cache, upon detecting that the access to the second data has ended.

4. An information processing method executed in a distributed processing system that processes data by a plurality of information processing apparatuses, comprising:
    extracting, by a first information processing apparatus of the plurality of information processing apparatuses, identification information of first data that has a possibility of being accessed after second data is accessed from a data storage unit that stores data in association with identification information of the data and identification information of related data that has a possibility of being accessed after the data is accessed, upon receiving a first request to request information for the first data from a second information processing apparatus that manages the second data; and transmitting, by the first information processing apparatus, the extracted identification information of the first data and identification information of an information processing apparatus that manages the first data to a transmission source of the first request.

5. The information processing method as set forth in claim 4, further comprising updating, by the first information processing apparatus, data stored in the data storage unit based on at least one of a relation among data contents, a storage location of data, and a timestamp of data.

6. The information processing method as set forth in claim 4, further comprising updating, by the first information processing apparatus, data stored in the data storage unit based on history of access to data in the distributed processing system.

7. A non-transitory computer-readable storage medium storing a program that causes a first information processing apparatus of a plurality of information processing apparatuses to execute a process, the process comprising:

obtaining, from a second information processing apparatus that manages relations among data, identification information of first data that has a possibility of being accessed after second data is accessed and identification information of an information processing apparatus that manages the first data, upon detecting access to the second data managed by the first information processing apparatus;

reading out the first data, upon determining that the information processing apparatus that manages the first data corresponds to the first information processing apparatus; and loading the first data into a cache.

8. A non-transitory computer-readable storage medium storing a program that causes a first information processing apparatus of a plurality of information processing apparatuses to execute a process, the process comprising:

extracting identification information of first data that has a possibility of being accessed after second data is accessed from a data storage unit that stores data in association with identification information of the data and identification information of data that has a possibility of being accessed after the data is accessed, upon receiving a first request to request information for the first data from a second information processing apparatus that manages the second data; and transmitting the extracted identification information of the first data and identification information of an information processing apparatus that manages the first data to a transmission source of the first request.

9. A first information processing apparatus, comprising:
a memory; and
a processor coupled to the memory and configured to:
obtain, from a second information processing apparatus that manages relations among data, identification information of first data that has a possibility of being accessed after second data is accessed and identification information of an information processing apparatus that manages the first data, upon detecting access to the second data managed by the first information processing apparatus;

read out the first data, upon determining that the information processing apparatus that manages the first data corresponds to the first information processing apparatus; and
load the first data into a cache.

10. A first information processing apparatus, comprising:
a memory; and
a processor coupled to the memory and configured to:
extract identification information of first data that has a possibility of being accessed after second data is accessed from a data storage unit that stores data in association with identification information of the data and identification information of data that has a possibility of being accessed after the data is accessed, upon receiving a first request to request information for the first data from a second information processing apparatus that manages the second data; and
transmit the extracted identification information of the first data and identification information of an information processing apparatus that manages the first data to a transmission source of the first request.

11. A distributed processing system, comprising:
a first information processing apparatus of a plurality of information processing apparatuses; and
a second information processing apparatus of the plurality of information processing apparatuses, which manages relations among data, and
wherein the first information processing apparatus comprises:
a first memory; and
a first processor coupled to the first memory and configured to:
obtain, from the second information processing apparatus, identification information of first data that has a possibility of being accessed after second data is accessed and identification information of an information processing apparatus that manages the first data by transmitting a first request to request information for the first data, upon detecting access to the second data managed by the first information processing apparatus;
read out the first data, upon detecting that the information processing apparatus that manages the first data corresponds to the first information processing apparatus; and
load the first data into a cache, and
the second information processing apparatus comprises:
a second memory; and
a second processor coupled to the second memory and configured to:
extract the identification information of the first data from a data storage unit that stores the data in association with identification information of the data and identification information of related data that has a possibility to be accessed after the data is accessed, upon receiving the first request from the information processing apparatus; and
transmit the extracted identification information of the first data and the identification information of the information processing apparatus that manages the first data to the first information processing apparatus.

* * * * *